(12) United States Patent
Desmet

(10) Patent No.: US 11,635,522 B2
(45) Date of Patent: Apr. 25, 2023

(54) AIRCRAFT WITH A SAFETY DISTANCE DISPLAY APPARATUS

(71) Applicant: AIRBUS HELICOPTERS DEUTSCHLAND GMBH, Donauworth (DE)

(72) Inventor: Lieven Desmet, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 654 days.

(21) Appl. No.: 16/687,922

(22) Filed: Nov. 19, 2019

(65) Prior Publication Data
US 2020/0217968 A1 Jul. 9, 2020

(30) Foreign Application Priority Data

Jan. 8, 2019 (EP) .................................... 19400002

(51) Int. Cl.
| | | |
|---|---|---|
| *G01S 17/933* | (2020.01) | |
| *B64D 45/08* | (2006.01) | |
| *B64D 47/06* | (2006.01) | |
| *G01S 7/481* | (2006.01) | |
| *G02B 27/30* | (2006.01) | |

(52) U.S. Cl.
CPC ............ *G01S 17/933* (2013.01); *B64D 45/08* (2013.01); *B64D 47/06* (2013.01); *G01S 7/481* (2013.01); *G02B 27/30* (2013.01)

(58) Field of Classification Search
CPC .................................................. G01S 17/933
See application file for complete search history.

(56) References Cited

U.S. PATENT DOCUMENTS

| | | | | |
|---|---|---|---|---|
| 4,916,445 A | * | 4/1990 | Crossley | ............... B64C 27/006 362/543 |
| 5,371,581 A | * | 12/1994 | Wangler | ................ G01S 17/933 340/963 |
| 5,555,175 A | * | 9/1996 | D'orso | ................... G08G 5/045 701/5 |
| 2003/0043363 A1 | | 3/2003 | Jamieson et al. | |

(Continued)

FOREIGN PATENT DOCUMENTS

| | | |
|---|---|---|
| EP | 3072812 A1 | 9/2016 |
| EP | 3372508 A1 | 9/2018 |

(Continued)

OTHER PUBLICATIONS

European Search Report for European Application No. EP 19400002. 2, Completed by the European Patent Office, dated Jun. 4, 2019, 7 pages.

*Primary Examiner* — Jean Paul Cass
(74) *Attorney, Agent, or Firm* — Brooks Kushman P.C.

(57) ABSTRACT

An aircraft with a safety distance display apparatus that is configured to display a visual indication on an obstacle for representing a current distance between the aircraft and the obstacle, wherein the safety distance display apparatus comprises a first light source that emits a first light signal in a first predefined direction, and a second light source that emits a second light signal in a second predefined direction, and wherein the first light signal crosses the second light signal at a predetermined safety distance from the aircraft.

20 Claims, 5 Drawing Sheets

(56) References Cited

U.S. PATENT DOCUMENTS

| | | | |
|---|---|---|---|
| 2005/0007257 A1* | 1/2005 | Rast | G02B 27/017 340/815.45 |
| 2016/0280393 A1 | 9/2016 | Mouton et al. | |
| 2019/0279419 A1* | 9/2019 | Scanlon | G02B 27/0966 |
| 2020/0135037 A1* | 4/2020 | Flotte | G05D 1/1064 |

FOREIGN PATENT DOCUMENTS

| | | | |
|---|---|---|---|
| JP | 2017132377 A | 8/2017 | |
| WO | 2017119537 A1 | 7/2017 | |

\* cited by examiner

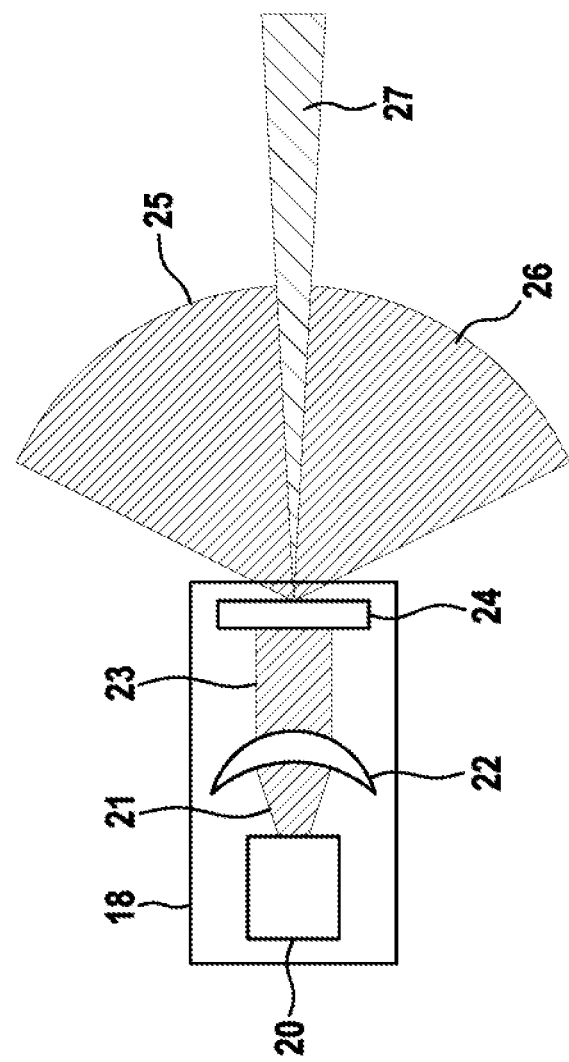
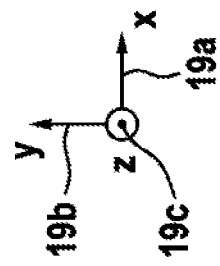
Fig. 2

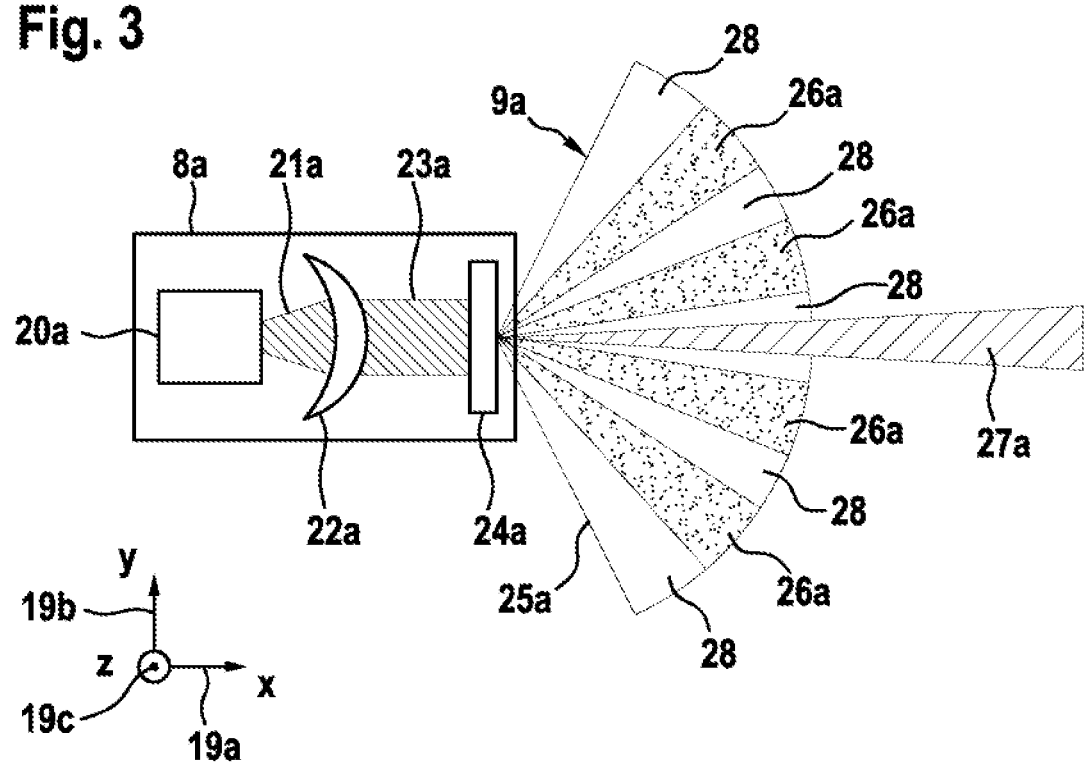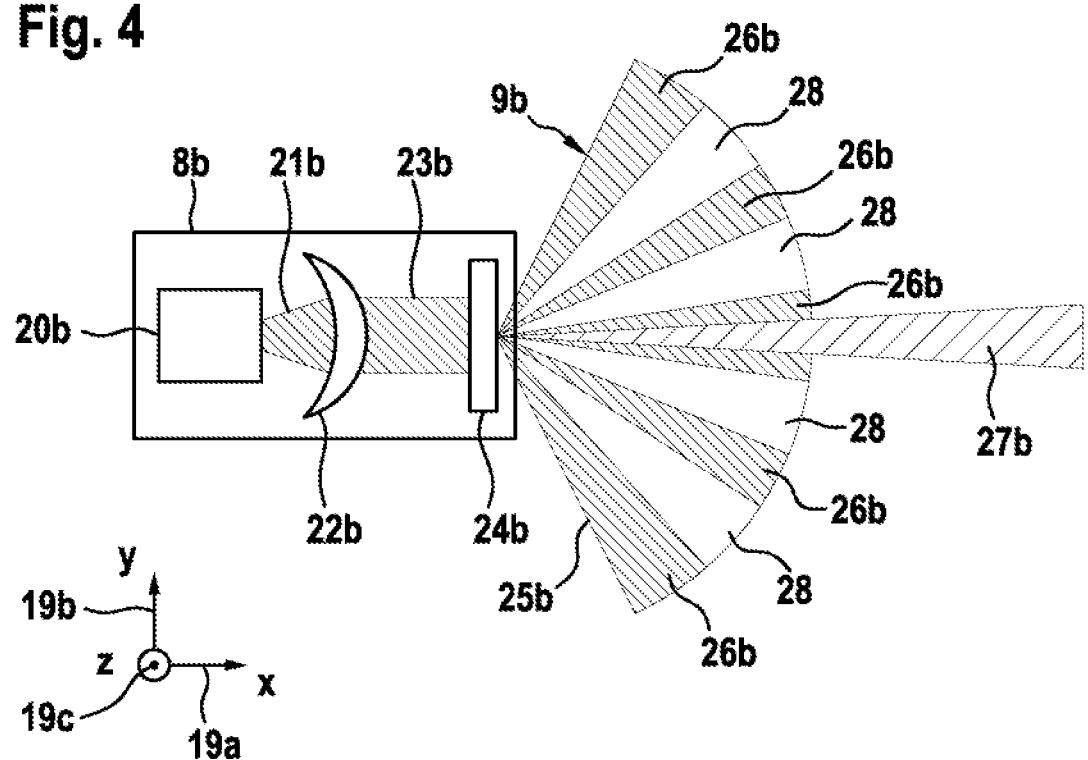

AIRCRAFT WITH A SAFETY DISTANCE DISPLAY APPARATUS

CROSS-REFERENCE TO RELATED APPLICATIONS

This application claims priority to European patent application No. EP 19400002.2 filed on Jan. 8, 2019, the disclosure of which is incorporated in its entirety by reference herein.

BACKGROUND OF THE INVENTION

(1) Field of the Invention

The invention is related to an aircraft with a safety distance display apparatus that is configured to display a visual indication on an obstacle for representing a current distance between the aircraft and the obstacle. The invention is further related to a corresponding safety distance display apparatus.

(2) Description of Related Art

The document JP 2017-132377 A describes such an aircraft that is illustratively embodied as a quadcopter drone. This quadcopter drone includes an irradiation device that is provided for irradiating light from an airframe of the quadcopter drone radially outwards. Thus, irradiated light can be projected on an obstacle that is in the surroundings of the quadcopter drone, in particular in the vicinity of the quadcopter drone. A respective image that is created by the projected irradiated light on the obstacle is bright and small when the quadcopter drone is close to the obstacle, and becomes dark when it is farther away from the quadcopter drone. Thus, an operator who operates the quadcopter drone may obtain information with respect to a respective distance between the quadcopter drone and the obstacle simply by looking at the created image. However, the operator needs to guess the information based on his experience and visual faculty so that the information as such is only very approximative.

More specifically, the irradiation device of the quadcopter drone according to the document JP 2017-132377 A permits the operator to get a feeling or sense with respect to a current distance between the quadcopter drone and a given obstacle, such that the operator may determine whether the quadcopter drone is e.g. drifting towards or away from the obstacle. Nevertheless, there is no concrete and exact analysis and interpretation of the created image possible, as it is entirely based on the operator's ad hoc interpretation of a subjectively observed brightness and size of the created image on the obstacle.

As a consequence, the irradiation device of the document JP 2017-132377 A is not suitable for real-life applications in which more precise and reliable information with respect to distances between aircrafts and respective obstacles is required. For instance, if an aircraft such as a helicopter is hovering close to a wind turbine generator, e.g. for hoisting above the nacelle resp. maintenance platform of the wind turbine generator, the pilot of the helicopter must take extreme care that the helicopter is not drifting towards the wind turbine generator structure and/or its wind turbine blades in order to prevent a potentially disastrous rotor strike of the helicopter's rotor blades against the wind turbine generator structure and/or its wind turbine blades. This is especially challenging during night conditions, when visibility to certain position reference points at the wind turbine generator is limited. Furthermore, comparatively slow helicopter side drift due to repetitive side wind gusts may easily go unnoticed by the pilot.

It should be noted that the above-described case is a very particular real-life application wherein an aircraft resp. helicopter comes in a specific flight condition comparatively close to an external structure that represents an obstacle to the aircraft. In other words, the above-described case is not comparable to the general detection of obstacles occurring in a flight path of an aircraft, such as a helicopter, which is a well-known task.

For instance, the documents US 2003/0043363 A1 and WO 2017/119537 A1 describe laser-based radar systems which use laser light for detecting obstacles occurring in a flight path of an aircraft. Such laser-based radar systems use laser devices which are usually mounted onto a main rotor shaft of the helicopter such that they are rotating around a rotational axis of the main rotor shaft together with the main rotor shaft.

Furthermore, the document EP 3 072 812 A1 describes a helicopter with a landing assistance display device that is adapted to generate vertical projections on ground for landing assistance. More specifically, the landing assistance display device is configured to create a concentric circle illumination on ground, which remains stable and almost identical ail over landing of the helicopter, independent on whether the helicopter is farther away from a respective landing zone or closer to the landing zone. In other words, there is no unambiguous visual cue about a current distance between the helicopter and the landing zone, which may indicate to the pilot whether the helicopter is too close or too far away from a respectively illuminated landing zone.

Moreover, the document U.S. Pat. No. 4,916,445 A describes an obstruction proximity indication system for an aircraft, such as a helicopter. The system indicates to a pilot an absolute minimum safe flying distance from the obstruction and, additionally, the distance between the minimum and nearby obstructions. The system comprises at least one first light source that provides a collimated beam extending past the rotor arc of the helicopter and a second light source that provides a collimated beam that similarly extends past the rotor arc to intersect the light beam from the first light source at a selected proximity limit location that can be selected to be on a level with the rotor and displaced a selected distance radially therefrom.

Furthermore, the document US 2005/0007257 A1 describes an apparatus and method for tracking an aircraft wingtip position during taxi operations to prevent wingtip ground incursion. A patterned illumination source is attached proximal to the wingtips to project a readily discernible target pattern in the direction of taxi travel. At least a portion of the target pattern is reflected off of any obstructions that lie in the straight-line direction of travel, such that the pilot can maneuver to avoid striking the obstruction. The patterned illumination source comprises a laser module positioned with the navigation and/or strobe light of the aircraft. The device may be retrofitted to an existing aircraft without additional wiring with the control of activation being selectable via power cycling of existing aircraft lighting controls.

However, in all of the above-described aircrafts, a precise and exact determination of a current distance between the aircraft and an obstacle is either not possible at ail or correspondingly provided devices are expensive and much too sophisticated. In other words, there is currently no aircraft available with a safety distance display apparatus which is simple and inexpensive.

BRIEF SUMMARY OF THE INVENTION

It is, therefore, an object of the present invention to provide a new aircraft with a safety distance display apparatus that is suitable to display a visual indication on an obstacle for reliably and securely representing a current distance between the aircraft and the obstacle.

This object is solved by an aircraft with a safety distance display apparatus, the aircraft comprising the features of claim 1.

More specifically, according to the present invention an aircraft with a safety distance display apparatus that is configured to display a visual indication on an obstacle for representing a current distance between the aircraft and the obstacle is provided. The safety distance display apparatus comprises a first light source that emits a first light signal in a first predefined direction, and a second light source that emits a second light signal in a second predefined direction. The first light signal crosses the second light signal at a predetermined safety distance from the aircraft. The first light signal forms a first pattern and the second light signal forms a second pattern. The first and second patterns preferably overlap at the predetermined safety distance and/or are concentric at the predetermined safety distance. The first pattern and the second pattern respectively comprise light sectors and unilluminated sectors. The light sectors of the first pattern preferably overlap with the unilluminated sectors of the second pattern at the predetermined safety distance and the light sectors of the second pattern preferably overlap with the unilluminated sectors of the first pattern at the predetermined safety distance.

Advantageously, the inventive aircraft comprises a safety distance display apparatus that is suitable to provide an unambiguous and reliable visual cue, in particular to a pilot of the aircraft. This safety distance display apparatus has a simple low-cost configuration and avoids a requirement for expensive post-analysis electronics, additional sensors or image capturing and image processing devices.

In general, the safety distance display apparatus of the inventive aircraft uses laser projection of two crossing light signals for providing a pilot of the aircraft with a visual external safety cue in order to allow the pilot to maintain a correct resp. safe distance between the aircraft and a given obstacle in the surroundings. Thus, the safety distance display apparatus e.g. allows for mitigation of sideward drift of the aircraft. Accordingly, if the aircraft is e.g. a rotary wing aircraft and, more particularly, a helicopter, potentially disastrous strikes between respective rotor blade tips of the helicopter and an obstacle in the surroundings, such as a wind turbine generator structure and/or corresponding wind turbine blades, may be avoided.

According to one aspect, the light signals project light lines onto the obstacle, which are created by emitted light planes and exemplarily chosen as a simplest form of usable light patterns. However, more intricate geometrical light patterns, in particular three-dimensional light patterns, may likewise be used, such as e.g. cones or pyramids. In any case, a key feature of the safety display apparatus consists in that the two emitted light signals intersect at a predetermined safety distance from the aircraft.

According to one aspect, the safety distance display apparatus of the inventive aircraft is not only suitable for allowing a pilot of the aircraft to maintain the correct safety distance between the aircraft and a given obstacle, but also to visually and unambiguously inform a pilot on whether the aircraft is drifting towards or away from the obstacle. This may easily be achieved by a change in a respectively emitted light pattern of each light signal, but also by a change in light color and/or light intensity of a respectively projected visual cue resp. visual indication.

More particularly, the safety distance display apparatus preferably comprises two light sources and, preferentially, two laser sources, which may either be used to project light patterns which are differing from each other, or which are provided with different characteristics in intensity and/or color. A first laser source is preferably mounted in an upper region resp. on top of the aircraft and the other laser source is preferably mounted in a lower region resp. on the bottom of the aircraft. According to one aspect, an underlying distance between the two laser sources is maximized in order to obtain a maximally achievable system sensitivity.

Preferably, each laser source has an optical element, such as a diffractive optical element, that transforms a respective laser beam generated by the laser source, preferentially a highly collimated laser beam, into a predetermined light pattern. As already mentioned above, the light pattern may have a particular intensity and/or color, and/or a preselected shape and form. Each light pattern is projected on a respective obstacle and upon intersecting the obstacle it creates a bright visually recognizable indication on a corresponding surface of the obstacle.

The user source which is mounted at the upper region of the aircraft and its diffractive element are mounted to the aircraft such that its emitted light signal is tilted under an associated tilt angle with respect to a reference plane. Similarly, the laser source at the lower region of the aircraft is mounted with its diffractive element such that its emitted light signal is tilted under an associated tilt angle upwards with respect to a reference plane. The tilting is preferably performed with respect to a horizontal reference plane, e.g. the horizon level horizontal plane, but may likewise also be performed with respect to a vertical reference plane, e.g. a cut plane of the aircraft in its longitudinal direction.

According to one aspect, at a predetermined distance from the aircraft, which is referred to as the predetermined safety distance, the emitted light signals of both laser sources intersect, i.e. the light signals cross each other at the predetermined safety distance. If the obstacle is located exactly at this predetermined safety distance from the aircraft, both light signals will cross on a surface of the obstacle, thereby creating a predefined visual cue for indicating the correct distance between the aircraft and the obstacle.

By way of example, if the aircraft is a rotary wing aircraft, in particular a helicopter, and if the obstacle is a wind turbine generator, then the obstacle may e.g. be one or more wind turbine blades of the wind turbine generator. In this case, the light signals emitted by the laser sources of the safety distance display apparatus of the helicopter will be projected onto the surfaces of the wind turbine blades. As long as the helicopter is maintained at the predetermined safety distance from the wind turbine blades, the light signals cross each other on the surface of the wind turbine blades of the wind turbine generator and are, thus, combined to a single visual information which represents the visual cue resp. indication. This single visual information consists of a mixture of selected characteristics of the light signals in intensity, color and/or pattern.

If, however, the helicopter drifts towards or away from the obstacle, i.e. if the predetermined safety distance is not maintained between the helicopter and the obstacle, the visual cue on the obstacle will change. Preferably, instead of seeing a single visual information on the obstacle, each one of the light signals emitted by the two laser sources that are mounted to the lower and upper region of the helicopter will become visible separately. In other words, each emitted light signal will be projected on the obstacle at separate locations.

More specifically, assuming that both laser sources project horizontal light lines onto the obstacle, then the pilot may know that the aircraft is drifting away from the obstacle if an upper i.e. top projected line on the obstacle shows the characteristics in intensity, color and/or specific pattern of the laser source that is mounted at the bottom of the aircraft. The pilot may even access a respective speed of drifting away from the obstacle by determining how fast a current distance between the top projected line and a respective associated bottom projected line becomes larger. In fact, the bottom projected line resp. lower projected line is the line that is emitted by the laser source that is mounted at the upper region of the aircraft.

Similarly, when the top projected line shows the characteristics of the laser source in intensity, color and/or specific pattern of the laser source that is mounted at the upper region of the aircraft, then the pilot knows that the aircraft is drifting towards the obstacle. In analogy to the case where the aircraft is drifting away from the obstacle, the pilot may determine a speed of drift upon looking on a given distance between respectively projected top and bottom lines.

As explained above, the safety distance display apparatus of the inventive aircraft comprises the first light source that emits the first light signal and the second light source that emits the second light signal and is intended to be a low-cost implementation that aims to provide a visual cue for a pilot of the aircraft. However, in some embodiments the pilot may also at least be assisted by a fully automated set-up. In this case, e. g. an imaging camera is provided for performing an image analysis of respectively projected light patterns on a given obstacle. Thus, an associated control system may either warn the pilot on the basis of the performed image analysis according to an observed drift, or it may automatically correct respective flight controls to mitigate the observed drift.

The first pattern may be a first light line and the second pattern may be a second light line. In addition, or alternatively, the first light signal may have a first color and the second light signal may have a second color. The first light signal may in addition, or alternatively, also have a first light intensity and the second light signal may also in addition, or alternatively, have a second light intensity.

Preferably, at least one of the first and second light sources comprises a highly collimated laser. Alternatively, at least one of the first and second light sources comprises an omnidirectionally emitting light, source and an associated collimating optical element.

Preferably, each one of the first and second light sources comprises an associated light encoding element for encoding the first and second light signals.

The first light source is preferably mounted to a lower region of a fuselage of the aircraft and the second light source is preferably mounted to an upper region of the fuselage.

According to one aspect, the first light signal is emitted at a first predetermined tilt angle with respect to an associated reference plane and the second light signal is emitted at a second predetermined tilt angle with respect to an associated reference plane. The associated reference planes are preferentially arranged in parallel.

According to one aspect, the aircraft is a rotary wing aircraft with a multi-blade main rotor that comprises associated rotor blades. The predetermined safety distance is preferably greater than a respective rotor blade length.

According to one aspect, an image analysis device is provided for monitoring a current distance between the aircraft and an obstacle on the basis of the first and second light signals.

By way of example, the predetermined safety distance preferably lies in a range between 10 m and 20 m. Furthermore, the first and second light sources are preferably spaced apart from each other by a distance of nominally 2 m, wherein a maximum acceptable positional error of the aircraft with respect to the obstacle amounts to approximately 0.5 m.

It should be noted that the exemplary predetermined safety distance as well as the spacing between the first and second light sources and the maximum acceptable positional error of the aircraft with respect to the obstacle are particularly relevant for a realization, wherein the inventive aircraft is implemented as a rotary wing aircraft, in particular a helicopter, and wherein the obstacle in consideration is a wind turbine generator and/or its wind turbine blades. In other words, the given exemplary dimensions are suitable for a real-life application in which a helicopter is intended to hover over a nacelle resp. maintenance platform of a wind turbine generator, as in this particular realization the given dimensions are most suitable.

However, it should be noted that the given dimensions may easily be adapted to other real-life applications. Corresponding adaptations are, nevertheless, considered to be readily available to the person skilled in the art and, therefore, also contemplated in the context of the present invention.

The present invention further provides a safety distance display apparatus for displaying a visual indication on an obstacle for representing a current distance between a vehicle and the obstacle. The safety distance display apparatus comprises a first light source that emits a first light signal in a first predefined direction and a second light source that emits a second light signal in a second predefined direction. The first light signal crosses the second light signal at a predetermined safety distance from the vehicle.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 2 shows a schematic view of a light source according to the present invention, FIG. 3 shows a schematic view of a first light source of the safety distance display apparatus of FIG. 1, FIG. 4 shows a schematic view of a second light source of the safety distance display apparatus of FIG. 1.

DETAILED DESCRIPTION OF THE INVENTION

Figure 1:
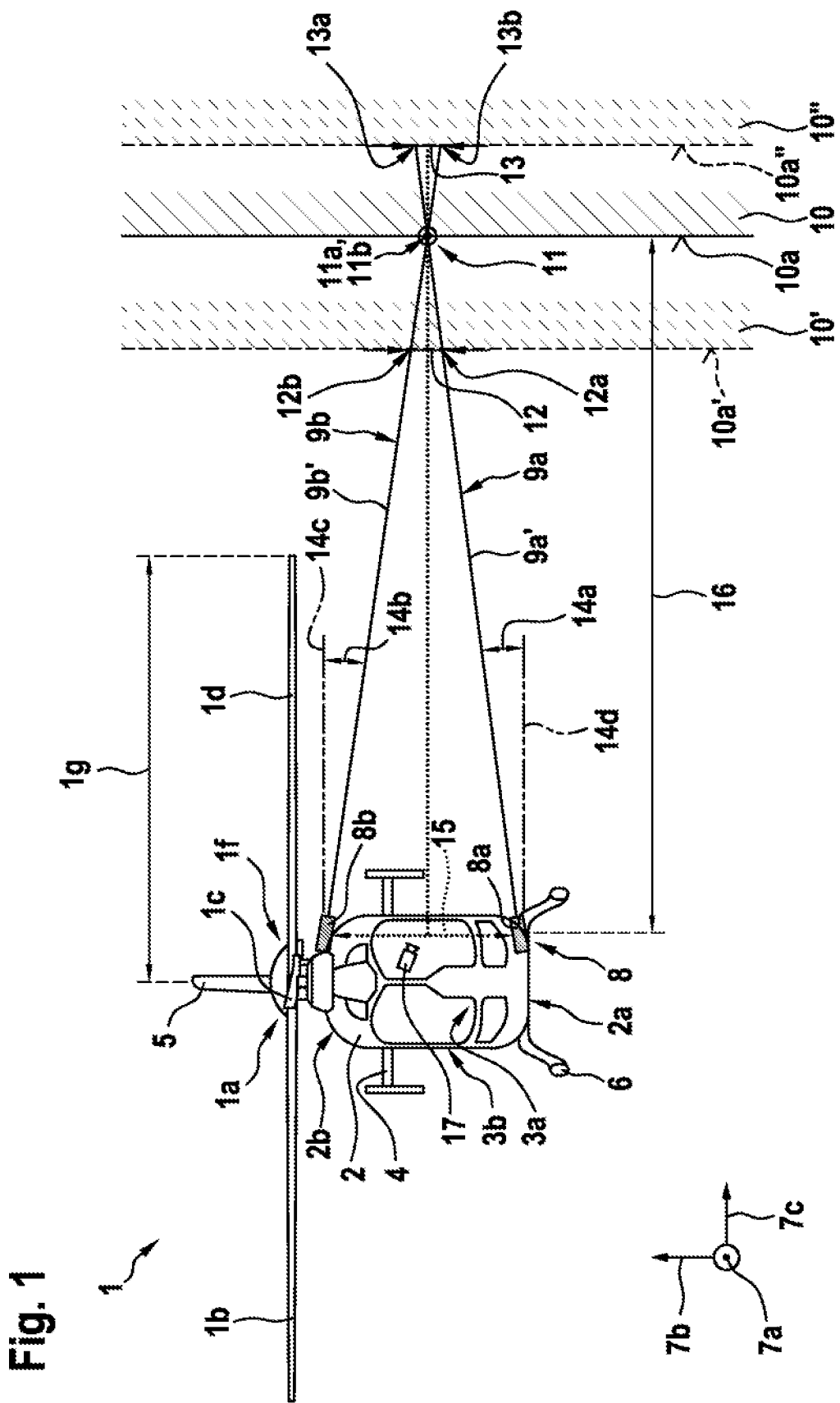
FIG. 1 shows a front view of an aircraft with a safety distance display apparatus according to the present invention.

FIG. 1 shows an aircraft 1 with a fuselage 2 that illustratively comprises a lower region 1a and an upper region 2b that is opposed to the lower region 2a. The fuselage 2 exemplarily defines at least a cockpit 3a of the aircraft 1. Illustratively, the fuselage 2 further defines a cabin 3b of the aircraft 1. The cockpit 3a and the cabin 3a are illustratively arranged between the lower region 2a and the upper region 2b of the fuselage 2.

According to one aspect, the aircraft 1 is provided with a safety distance display apparatus 8. The aircraft is exemplarily embodied as a rotary wing aircraft and, more particularly, as a helicopter with at least one multi-blade main rotor 1a for providing lift and forward or backward thrust operation. Therefore, the aircraft 1 is also referred to hereinafter as the "helicopter 1" for simplicity and clarity. It should, however, be noted that the present invention is not limited to helicopters and can likewise be applied to other aircrafts and, more generally, to other vehicles that can be equipped with a safety distance display apparatus such as the safety distance display apparatus 8 according to the present invention.

For purposes of illustration, the helicopter 1 is shown with a first axis 7a in longitudinal direction, which is defined by the helicopter's roll axis that is inherent to the helicopter 1 and which is hereinafter referred to as the "roll axis 7a", for simplicity and clarity. The helicopter 1 is further shown with a second axis 7b in height direction, which is defined by the helicopter's yaw axis and which is hereinafter referred to as the "yaw axis 7b", for simplicity and clarity. Preferably, but not necessarily, the helicopter 7 is symmetrical about the yaw axis 7b and the roll axis 7a. Furthermore, the helicopter is shown with a third axis 7c in lateral direction, which is defined by the helicopter's pitch axis and which is hereinafter referred to as the "pitch axis 7c", for simplicity and clarity.

Illustratively, the at least one multi-blade main rotor 1a of the helicopter 1 comprises a plurality of rotor blades 1b, 1c, 1d. The latter are mounted at an associated rotor head 1f that is arranged on top, i.e. above the upper region 2b of the fuselage 2 to a rotor shaft, which rotates in operation of the helicopter 1 around an associated rotor axis. At least one, and preferably each one, of the rotor blades 1b, 1c, 1d has an associated rotor blade length 1g, which is exemplarily only shown with respect to the rotor blade 1d.

According to one aspect, the helicopter 2 further comprises at least one preferentially shrouded counter-torque device configured to provide counter-torque during operation, i.e. to counter the torque created by a rotation of the at least one multi-blade main rotor 1a for purposes of balancing the helicopter in terms of yaw. The at least one counter-torque device is preferably provided at an aft section of a tail boom, which is formed by or attached to the fuselage 2 and which comprises horizontal tail 4 and a fin 5.

Preferably, the fuselage 2 is further connected to a landing gear 6 of the helicopter 1. By way of example, the landing gear 6 is a skid-type landing gear. However, wheel-type landing gears or other landing gears are likewise contemplated. Furthermore, the skid-type landing gear 6 is illustratively of the non-retractable type. However, a landing gear of the retractable type may likewise be provided.

As already mentioned above, the helicopter 1 is according to one aspect provided with the safety distance display apparatus 8, which is preferably configured to display a visual indication 11 on an obstacle 10 for representing a current distance between the helicopter 1 and the obstacle 10. Preferably, the safety distance display apparatus 8 comprises at least one first light source 8a and at least one second light source 8b.

By way of example, and for simplifying the present description, reference is only made to a single first light source 8a and a single second light source 8b. However, it should be noted that more than a single first light source 8a and a single second light source 8b may likewise be employed.

The first light source 8a preferably emits a first light signal 9a in a first predefined direction 9a'. The second light source 8b b preferably emits a second light signal 9b in a second predefined direction 9b'.

The first light signal 9a preferably crosses the second light signal 9b at a predetermined safety distance 16 from the helicopter 1. In the illustrated example, the first light signal 9a crosses the second light signal 9b on a surface 10a of the obstacle 10, which is, thus, illuminated by the first and second light signals 9a, 9b.

More specifically, the first light signal 9a preferably forms a first pattern 11a on the illuminated surface 10a of the obstacle 10 and the second light signal 9, preferably forms a second pattern 11b on the surface 10a. As the first and second light signals 9a, 9b cross each other at the surface 10a of the obstacle 10, the first and second patterns 11b overlap at the surface 10a and, thus, overlap at the predetermined safety distance 16 from the helicopter 1.

Alternatively, instead of overlapping the first and second patterns 11a, 11b may simply be concentric on the surface 10a, i.e. at the predetermined safety distance 16 from the helicopter 1. In particular, in an application-specific manner and also dependent on the pattern, color and intensity of the first and second light signals 9a, 9b that are generated by the first and second light sources 8a, 8b, the visual indication 11 on the surface 10a of the obstacle 10 may vary. An exemplary visual indication that implements the visual indication 11 is described by way of example below with reference to FIG. 5.

According to one aspect, the first light source 8a is mounted to the lower region 2a of the fuselage 2 of the helicopter 1 and the second light source 8b is mounted to the upper region 2b of the fuselage 2. Furthermore, in order to allow crossing of the first and second light signals 9a, 9b emitted by the first and second light sources 8a, 8b at the predetermined safety distance 16 from the helicopter 1, the first light signal 9a is preferably emitted from the first light source 8a at a first predetermined tilt angle 14a with respect to an associated reference plane 14d and the second light signal 9b is preferably emitted by the second light source 8b at a second predetermined tilt angle 14b with respect to an associated reference plane 14c.

Illustratively, the associated reference planes 14c, 14d are arranged in parallel. By way of example, the associated reference planes 14c, 14d are further arranged in parallel to a horizontal reference plane and, illustratively, to the pitch axis 7c of the helicopter 1. However, as mentioned above the associated reference planes 14c, 14d must not necessarily by arranged horizontally, and may also be vertical reference planes or planes that are arranged in a predetermined angle with respect to the horizontal reference plane, as long as they are arranged such that the first and second light signals 9a, 9b emitted by the first and second light sources 8a, 8b cross each other at the predetermined safety distance 16 from the helicopter 1.

The predetermined tilt angles 14a, 14b are on the one hand dependent on the predetermined safety distance 16 and on the other hand dependent on a predetermined distance 15 in direction of the yaw axis 7b of the helicopter 1 between the lower and upper light sources 8a, 8b. In an exemplary realization, the predetermined distance 15 amounts at least approximately to 2 m. In other words, the first and second light sources 8a, 8b are spaced apart from each other in direction of the yaw axis 7b by the distance 15 of nominally 2 m.

Furthermore, assuming an application wherein the predetermined safety distance 15 is calculated with respect to the helicopter 1 that is used for hovering close to a wind turbine generator for hoisting above a nacelle resp. maintenance platform of the wind turbine generator, then the predetermined safety distance 16, e.g. with respect to the wind turbine blades of the wind turbine generator, lies preferably in a range between 10 m and 20 m. In this case, a maximum acceptable positional error of the helicopter 1 with respect to the obstacle 10 amounts preferably to approximately 0.5 m. However, in any case the predetermined safety distance 16 must be greater than the rotor blade length 1g of the rotor blades 1b, 1c, 1d of the multi-blade main rotor 1a of the helicopter 1, as illustrated.

According to one aspect and as already described above, the visual indication 11 is intended to provide a visual cue to the pilot of the helicopter 1 with respect to the predetermined safety distance 16. However, the pilot may also at least be assisted by an image analysis device 17 that may be provided for monitoring a current distance between the helicopter 1 and the obstacle 10 on the basis of the first and second light signals 9a, 9b. The image analysis device 17 may also be used to provide control information to flight controls of the helicopter 1 such that the current distance between the helicopter 1 and the obstacle 10 may be adjusted as required for maintaining the predetermined safety distance 16 independent of the pilot's control.

FIG. 1 further illustrates, by way of example, two additional positions of the obstacle 10 with respect to the helicopter 1: a first position in which the obstacle 10 is closer to the helicopter 1, i.e. wherein a current distance is smaller than the predetermined safety distance 16, and a second position in which the obstacle 10 is farther away from the helicopter 1, i.e. wherein a current distance is greater than the predetermined safety distance 16. In the first position, the obstacle 10 is referred to as "the obstacle 10'", and in the second position it is referred to as "the obstacle 10''", for simplicity and clarity. Furthermore, the respectively illuminated surface of the obstacle 10' is referred to with the reference sign 10a' and the respectively illuminated surface of the obstacle 10'' is referred to with the reference sign 10a''.

In the illustrated example, the surface 10a' of the obstacle 10' is illuminated by the light signals 9a, 9b of the light sources 8a, 8b such that the light signal 9a projects a light pattern 12a onto the surface 10a' and that the light signal 9b projects a light pattern 12b on the surface 10a'. Illustratively, the projected light patterns 12a, 12b are spaced apart by a distance 12 and the projected light pattern 12a of the lower light source 8a is located below the projected light pattern 12b of the upper light source 8b.

Thus, the pilot of the helicopter 1 may at least recognize that the current distance between the helicopter 1 and the obstacle 10' is smaller than the predetermined safety distance 16, as the projected light pattern 12b is above the projected light pattern 12a. Furthermore, by looking at the distance 12 between the projected light patterns 12a, 12b, the pilot may derive an information with respect to the current distance, i.e. he may derive from the distance 12 the difference between the current distance and the predetermined safety distance 16. More specifically, the greater the distance 12 between the projected light patterns 12a, 12b is, the smaller the current distance is. The projected light patterns 12a, 12b on the obstacle 10' are described below with reference to FIG. 6 in an exemplary realization.

Similarly, on the surface 10a'' of the obstacle 10'', a light pattern 13a is projected by the lower light source 8a and a light pattern 13b is projected by the upper light source 8b. The projected light patterns 13a, 13b are illustratively spaced apart by a distance 13. However, an contrast to the projected light patterns 12a, 12b, now the projected light pattern 13a of the lower light source 13a is above the projected light pattern 13b of the upper light source 8a, thus, indicating that the current distance between the helicopter 1 and the obstacle 10' is greater than the predetermined safety distance 16.

Furthermore, the pilot may again derive an information of the current distance by determining the distance 13 between the projected light patterns 13a, 13b. More specifically, the greater the distance 13 between the projected light patterns 13a, 13b is, the greater the current distance is. The projected light patterns 13a, 13b are in an exemplary realization described below with reference to FIG. 7.

FIG. 2 shows an exemplary light source 18 that may be used to implement each one of the light sources 8a, 8b of FIG. 1. For simplifying the following description, a coordinate system is shown with an X-axis 19a, a Y-axis 19b and a Z-axis 19c. In the exemplary configuration of FIG. 1, the X-axis 19a corresponds to the pitch axis 7c, the Y-axis 19b corresponds to the roll axis 7a and the Z-axis 19c corresponds to the yaw axis 7b.

According to one aspect, the light source 18 comprises a light emitting device 20 that is configured to emit a light beam 21. The light beam 21 is preferably collimated by an optical element 22 such that a collimated light beam 23 is created. The collimated light beam 23 is then preferably spread into a light plane 25 in the XY-plane by a diffractive optical element 24. The generated light plane 25 preferably comprises at least one light sector 26.

In the illustrated example, the light emitting device 20 is an omnidirectionally emitting light source, such as an LED. In this case, the collimating optical element 22 is required as an additional optics in order to collimate the light beam 21 that is emitted by the light emitting device 20, i.e. the omnidirectionally emitting light source, into the collimated light beam 23 with preferentially low divergence, e.g. 1.5 millirad.

If, alternatively, the light emitting device 20 is a highly collimated laser, the collimating optical element 22 can be omitted, as in this case the light beam 21 that is emitted by the light emitting device 20, i.e. the highly collimated laser, is already highly collimated. In other words, the collimating optical element 22 is optional and may be omitted dependent on a respectively selected light emitting device 20.

The diffractive optical element 24, in turn, may e.g. be transmissive, reflective or holographic diffractive element. This diffractive optical element 24 is preferably adapted to spread the incident collimated light beam 23 into the light plane 25 without deteriorating the original beam divergence in the normal direction, i.e. the direction of the Z-axis 19c. Alternatively, the diffractive optical element 24 may be replaced by a rotating mirror device to generate the light plane 25. However, as such a rotating mirror device requires moving parts, the diffractive optical element 24, which does not contain any moving parts, is preferred.

Moreover, according to one aspect the collimating function of the collimating optical element 22 is directly encoded in the diffractive optical element 24. In this case, a configuration of the light source 18 may advantageously be simplified, as a single optical element is used instead of the two optical elements 22, 24.

Moreover, according to one aspect, the diffractive optical element 24 is implemented as a light encoding element which is configured to encode the collimated light beam 23. By way of example, encoding may comprise the creation of a particular light pattern, color and/or intensity.

Finally, it should be noted that only for further clarifying properties of the light plane 25, the latter is additionally shown in the XZ-plane. In the XZ-plane, the light plane 25 is preferably formed by a light beam 27 with a comparatively small beam divergence, preferably less than 1.5 millirad.

Furthermore, it should be noted that laser pattern projectors that use diffractive optical elements to project lines or specific patterns onto objects or obstacles are well-known in the art. Therefore, a more detailed description of the light source 18 can be omitted for brevity and conciseness.

FIG. 3 shows an exemplary configuration of the lower light source 8a of FIG. 1 that emits the light signal 9a. According to one aspect, the exemplary configuration corresponds to the configuration of the light source 18 of FIG. 2.

More specifically, the lower light source 8a preferably comprises a light emitting device 20a that is configured to emit a light beam 21a towards a collimating optical element 22a. The light emitting device 20a may be an omnidirectional emitting light source, such as an LED, or a highly collimated laser. In the latter case, the collimating optical element 22a may be omitted. The collimating optical element 22a collimates the light beam 21a such that a collimated light beam 23a is emitted to a diffractive optical element 24a which, in turn, creates as the light signal 9a of FIG. 1 exemplarily a light plane 25a.

In contrast to FIG. 2, the light plane 25a now illustratively comprises a predefined number of light sectors 26a as well as unilluminated sectors 28 such that a fan-shape structure is created. Again, for comparison purposes only, a comparative light beam 27a is shown which represents the light plane 25a in the XZ-plane.

However, it should be noted that the light plane 25a with the predefined number of light sectors 26a and the unilluminated sectors 28 is merely one example for the light signal 9a that is emitted by the lower light source 8a. In this case, the light plane 25a forms the light patterns 11a, 12a, 13a of FIG. 1, as described in more detail below with reference to FIG. 5 to FIG. 7, which are respectively projected onto the surfaces 10a, 10a', 10a' of the obstacles 10, 10', 10" of FIG. 1 in the form of light lines.

Alternatively, or in addition, the light signal 9a may also be emitted with a predefined color and/or light intensity. Furthermore, instead of forming the light plane 25a, the light signal 9a may form any other geometric form, such as e.g. a circle, oval, polygon, and so on.

FIG. 4 shows an exemplary configuration of the upper light source 8b of FIG. 1 that emits the light signal 9b. According to one aspect, the exemplary configuration corresponds to the configuration of the light source 18 of FIG. 2.

More specifically, the upper light source 8b preferably comprises a light emitting device 20b that is configured to emit a light beam 21b towards a collimating optical element 22b. The light emitting device 20b may be an omnidirectionally emitting light source, such as an LED, or a highly collimated laser. In the latter case, the collimating optical element 22b may be omitted. The collimating optical element 22b collimates the light beam 21b such that a collimated light beam 23b is emitted to a diffractive optical element 24b which, in turn, creates as the light signal 9b of FIG. 1 exemplarily a light plane 25b.

In contrast to FIG. 2, the light plane 25b now illustratively comprises a predefined number of light sectors 26b as well as unilluminated sectors 28 such that a fan-shape structure is created. Again, for comparison purposes only, a comparative light beam 27b is shown which represents the light plane 25b in the XZ-plane.

However, it should be noted that the light plane 25b with the predefined number of light sectors 26b and the unilluminated sectors 28 is merely one example for the light signal 9b that is emitted by the upper light source 8b. In this case, the light plane 25b forms the light patterns 11b, 12b, 13b of FIG. 1, as described in more detail below with reference to FIG. 5 to FIG. 7, which are respectively projected onto the surfaces 10a, 10a', 10a" of the obstacles 10, 10', 10" of FIG. 1 in the form of light lines.

Alternatively, or in addition, the light signal 9b may also be emitted with predefined color and/or light intensity. Furthermore, instead of forming the light plane 25a, the light signal 9a may form any other geometric form, such as e.g. a circle, oval, polygon, and so on, which preferably corresponds to the geometrical form of the light signal 9a of FIG. 3.

Figure 5:
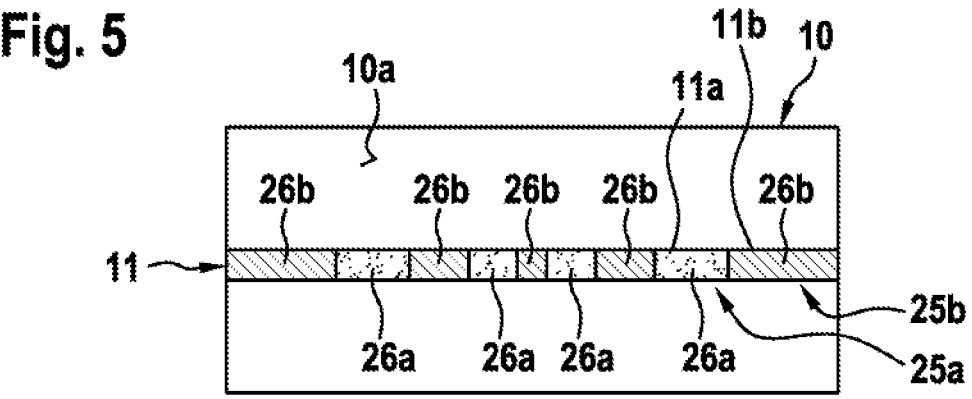
FIG. 5 shows a front view of an illuminated surface of an object that is located at a predetermined safety distance from the aircraft of FIG. 1.

FIG. 5 shows the illuminated surface 10a of the obstacle 10 of FIG. 1 which is, as described above with reference to FIG. 1, located at the predetermined safety distance 16 from the helicopter 1 of FIG. 1. On the surface 10a, illustratively the light patterns 11a, 11b created by the light signals 9a, 9b of FIG. 3 and FIG. 4 overlap each other, as the light signals 9a, 9b are crossing on the surface 10a of the obstacle 10.

More specifically, according to one aspect the light planes 25a, 25b created by the light sources 8a, 8b of FIG. 3 and FIG. 4 form the visual indication 11 of FIG. 1. Illustratively, the light plane 25a forms the first pattern 11a which comprises the light sectors 26a and the unilluminated sectors 28 as described above with reference to FIG. 3. Similarly, the light plane 25b forms the second pattern 11b which comprises the light sectors 26b and the unilluminated sectors 28, as described above with reference to FIG. 4.

On the surface 10a, the light sectors 26a of the first pattern 11a preferably overlap with the unilluminated sectors 28 of the second pattern 11b and the light sectors 26b of the second pattern 11b preferably overlap with the unilluminated sectors 28 of the first pattern 11a. Thus, a continuous line is illuminated on the surface 10a, which defines the visual indication 11. Accordingly, if the pilot of the helicopter 1 of FIG. 1 recognizes a single continuous line on the surface 10a of the obstacle 10, he is aware that the helicopter 1 is at the predetermined safety distance 16 of FIG. 1 with respect to the obstacle 10.

Figure 6:
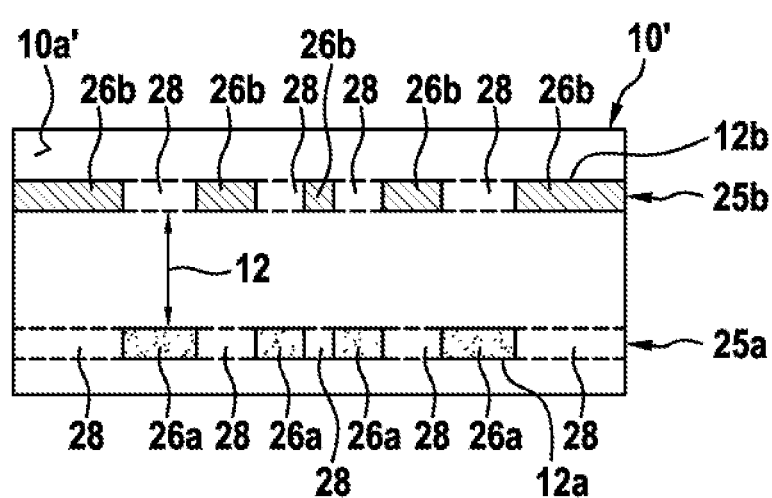
FIG. 6 shows a front view of an illuminated surface of an object that is located at a distance from the aircraft of FIG. 1 which is smaller than a predetermined safety distance.

FIG. 6 shows the obstacle 10' with the surface 10a' which is, according to FIG. 1, at a current distance from the helicopter 1 of FIG. 1 which is smaller than the predetermined safety distance 16 of FIG. 1. Accordingly, the light planes 25a, 25b of the light sources 8a, 8b of FIG. 3 and FIG. 4 are not overlapped, but spaced apart by the distance 12 of FIG. 1.

In other words, the horizontal light planes 25a, 25b which define the projected light pattern 12b, 12b of FIG. 1 may be visually distinguished from each other as two separately illuminated light lines on the surface 10a'. As the projected light pattern 12a is located below the projected light pattern 12b, the pilot knows that the current distance between the helicopter 1 of FIG. 1 and the object 10' of FIG. 1 is smaller than the predetermined safety distance 16 of FIG. 1, as explained above with respect to FIG. 1. The size of the distance 12 gives an indication about the current distance.

Figure 7:
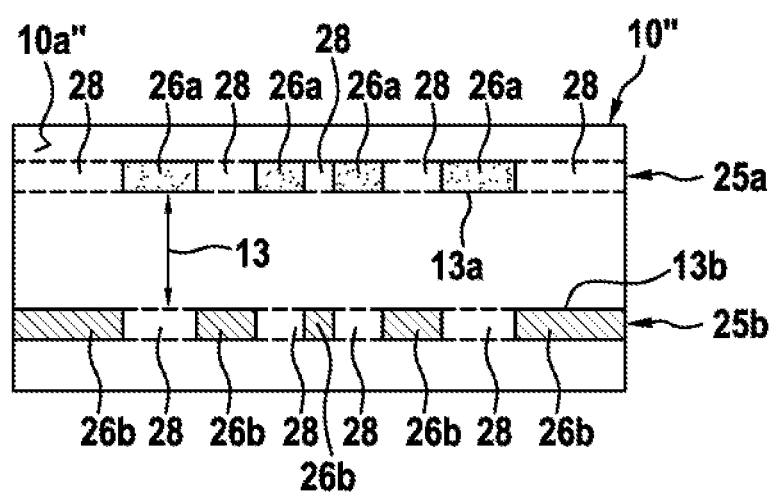
FIG. 7 shows a front view of an illuminated surface of an object that is located at a distance from the aircraft of FIG. 1 which is greater than a predetermined safety distance.

FIG. 7 shows the obstacle 10' with the surface 10a' of FIG. 1. In analogy to FIG. 6, the light planes 25a, 25b are illuminating to distinguishable light lines on the surface 10a'', i.e. the projected light patterns 13a, 13b of FIG. 1, which are spaced apart by the distance 13 of FIG. 1. In contrast to FIG. 6, however, as the projected light pattern 13a is illustratively above the projected light pattern 13b, this is an indication for the pilot of the helicopter 1 of FIG. 1 that a current distance between the helicopter 1 and the obstacle 10'' is greater than the predetermined safety distance 16 of FIG. 1, as explained above. The size of the distance 12 gives an indication about the current distance.

Figure 8:
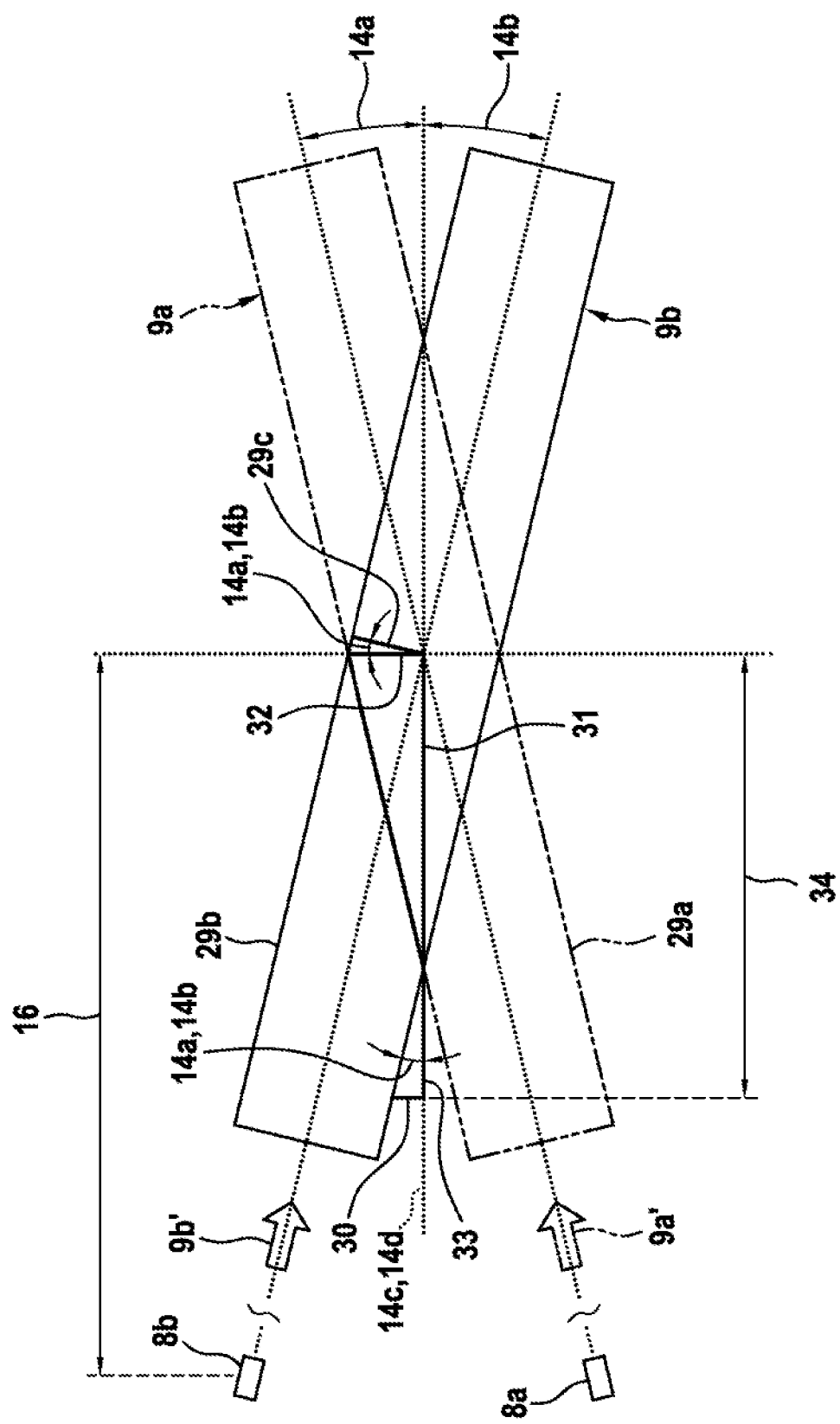
FIG. 8 shows a schematic diagram that illustrates optical characteristics of the safety distance display apparatus of FIG. 1.

FIG. 8 shows the lower and upper light sources 8a, 8b of FIG. 1, which emit the light signals 9a, 9b of FIG. 1 in the predefined directions 9a', 9b', such that the light signals 9a, 9b cross each other at the predetermined safety distance 16 of FIG. 1. As described above with reference to FIG. 3 and FIG. 4, the light signals 9a, 9b are preferably emitted as the light planes 25a, 25b of FIG. 3 and FIG. 4 onto the obstacle 10 of FIG. 1.

As illustrated by means of the comparative light beams 27a, 27b of FIG. 3 and FIG. 4, the light planes 25a, 25b have a given thickness when being projected onto the surface 10a of the obstacle 10 of FIG. 1, which results from a respective beam divergence of the light beams 27a, 27b of FIG. 3 and FIG. 4. In order to simplify the following description, it is assumed that each one of the light signals 9a, 9b can be approximated as a light plane 29a, 29b, respectively, with a constant thickness over at least a predefined range of spacing with respect to the obstacle 10. Therefore, rectangular structures are shown for exemplifying the light planes 29a, 29b.

More particularly, FIG. 8 should be understood as an attempt to estimate whether the safety distance display apparatus 8 with the lower and upper light sources 8a, 8b of FIG. 1 may easily be implemented with using realistic technology parameters and with taking into account realistic distances and sizes. Accordingly, it is assumed hereinafter that the distance 15 of FIG. 1 by which the light sources 8a, 8b are spaced apart from each other amounts to 2 m within a symmetrical set-up. Furthermore, it is assumed that the light sources 8a, 8b are implemented by means of lasers having a beam divergence of 1.5 millirad (total angular spread $\theta$=1.5 millirad). It is further assumed that the eye of the pilot has an angular resolution in its central view of $\beta$=1 arcminute and that the predetermined safety distance 16 lies in a range between 10 m and 20 m and, more precisely, is assumed to be D=10 m.

Using these dimensions, a respective accuracy of the safety distance display apparatus 8 of FIG. 1 may be determined. This accuracy corresponds to an underlying depth of field (DOF) or respective range over which the helicopter 1 of FIG. 1 may drift with respect to the obstacle 10 of FIG. 1 before the projected light patterns 12a, 12b or 13a, 13b of FIG. 1 become distinguishable as separate light pattern for a human eye instead of the overlapped light patterns 11a, 11b of FIG. 1 which form the visual indication 11.

Assuming now as indicated above the total angular spread $\theta$=1.5 millirad and the predetermined safety distance D=10 m, a respective thickness t of the light planes 29a, 29b can be calculated using the relationship $$t = 2D\tan\left(\frac{\theta}{2}\right)$$

to t=15 mm. However, hereinafter a safety margin is considered and the thickness t is therefore set to t=20 mm. Using this parameter, the length of a half of thickness line 29c can be determined to t/2=10 mm.

Subsequently, by using the angular resolution $\beta$=1 arcminute of the eye, a distance between the light planes 29a, 29b x may be calculated using the relationship $$x = 2D\tan\left(\frac{\beta}{2}\right)$$

to x=2.9 mm. Using this parameter, a length of a half of light plane separation distance line 30 can be determined as being x/2=1.45 mm.

Furthermore, the tilt angle $\alpha$, i.e. the tilt angles 14a, 14b of the light sources 18a, 18b, can be calculated using the relationship $$\alpha = a\tan\left(\frac{d/2}{D}\right)$$

to $\alpha$=5.71°.

Moreover, a first component 31 of the underlying depth of field (DOF), which is hereinafter designated as the component "A" and which corresponds to a distance between a first location, where intersection of the rectangular structures 29a, 29b occurs, and the obstacle 10, may be determined using the relationship $$A = \frac{B*S}{\left(\frac{X}{2}\right)}$$

to A=100.509157 mm.

Likewise, a vertical component required for length determination of this first component 31, which is referred to as the vertical component 32 and hereinafter designated as the component "S", may be determined using the relationship $$S = \frac{\left(\frac{t}{2}\right)}{\cos\alpha}$$

to S=10.049865 mm.

Moreover, a second component 33 of the underlying depth of field (DOF), which is hereinafter designated as the component "B", can be determined using the relationship $$B = \frac{\left(\frac{x}{2}\right)}{\tan\alpha}$$

to B=14.501516 mm.

On the basis of the above-determined values, the depth of field (DOF) can be determined using the relationship

DOF=2(A+B)

to approximately 230 mm. Half of the depth of field (DOF) is illustrated in FIG. 8 and referred to with the reference sign 34.

If now a 7-fold degradation of the angular eye resolution β is assumed, which means that the separation x of the visual cue lines becomes 7 times bigger such that x increases from 2.9 mm to approximately 20 mm, a helicopter-obstacle distance error of (A+7B)=202 mm is obtained, or a depth of field (DOF) of DOF=2(A+7B)=404 mm<0.5 m.

In conclusion, even when assuming a comparatively bad pilot visual acuity, a positional error of the helicopter 1 of FIG. 1 with respect to the obstacle 10 of FIG. 1 of not more than 0.5 m may occur. In other words, by setting a maximum acceptable positional error of the helicopter 1 with respect to the obstacle 10 to approximately 0.5 m, the safety distance display apparatus 8 would operate within acceptable margins and tolerances.

Finally, it should be noted that modifications to the above-described embodiments are within the common knowledge of the person skilled in the art and, thus, also considered as being part of the present invention. For instance, although the detailed description of the figures makes only reference to visible light, the light sources of the safety distance display apparatus according to the present invention may also emit infrared light, in particular infrared light with different light intensities. This may be applicable e.g. during night missions where invisible infrared wave length light signals may be recognized by the pilot of the helicopter by means of suitable night vision devices.

Furthermore, it should be noted that pattern, color and intensity of the emitted light signals can almost be freely selected, as described above. However, a key point in selection of the light signals consist in selecting them in a manner such that a combination of their respective attributes to the visual indication 11 of FIG. 1 and FIG. 5 gives an unambiguous and reliable visual cue to the pilot of the helicopter. Such an unambiguous and reliable visual cue may be obtained by two overlapping lines or other geometrical shapes, as exemplarily described above, but also by otherwise combined forms, such as e.g. a cross that fits into a rectangle at the predetermined safety distance, a semicircle and an associated inverted semicircle which fit together to a complete circle at the predetermined safety distance, a vertical line and a circular form which fit together to form a "D" at the predetermined safety distance, and so on.

Similarly, two different colors may be selected, such that the overlapping results in still another color. For instance, a yellow light signal and a blue light signal may be used such that the overlapped signal is green, and so on.

REFERENCE LIST 1 aircraft
1a multi-blade main rotor
1b, 1c, 1d rotor blades
1f rotor head
1g rotor blade length
2 fuselage
2a fuselage lower region
2b fuselage upper region
3a cockpit
3b cabin
4 horizontal tail
5 fin
6 landing gear
7a roll axis
7b yaw axis
7c pitch axis
8 safety distance display apparatus
8a lower light source
8b upper light source
9a light signal of the lower light source
9a' emitting direction of the light signal of the lower light source
9b light signal of the upper light source
9b' emitting direction of the light signal of the upper light source
10 obstacle at predetermined safety distance
10a illuminated surface of the obstacle at the predetermined safety distance
10' obstacle at a distance that is smaller than the predetermined safety distance
10a' illuminated surface of the obstacle at the distance that is smaller than the predetermined safety distance
10" obstacle at a distance that is greater than the predetermined safety distance
10a" illuminated surface of the obstacle at the distance that is greater than the predetermined safety distance
11 visual indication with overlapping area of the light signals projected onto the illuminated surface of the obstacle at the predetermined safety distance
11a, 11b projected overlapping light pattern of the lower and upper light sources
12 distance between the light signals projected onto the illuminated surface of the obstacle at the distance that is smaller than the predetermined safety distance
12a projected light pattern of the lower light source
12b projected light pattern of the upper light source
13 distance between the light signals projected onto the illuminated surface of the obstacle at the distance that is greater than the predetermined safety distance
13a projected light pattern of the lower light source
13b projected light pattern of the upper light source
14a tilt angle of lower light source
14b tilt angle of upper light source
14c, 14d reference planes
15 predetermined distance between lower light source and upper light source
16 predetermined safety distance
17 image analysis device
18 light source
19a X-axis
19b Y-axis
19c Z-axis
20, 20a, 20b light emitting devices
21, 21a, 21b light beams emitted from the light emitting devices
22, 22a, 22b collimating optical elements
23, 23a, 23b collimated light beams
24, 24a, 24b diffractive optical elements
25, 25a, 25b light planes in kip-plane
26, 26a, 26b light sectors of light planes
27, 27a, 27b comparative light planes in XZ-plane
28 unilluminated sectors 29a light plane created with the light signal of the lower light source
29b light plane created with the light signal of the upper light source
29c half of light plane thickness line
30 half of light plane separation distance line
31 first component of depth of field
32 vertical component required for length determination of the first component
33 second component of depth of field
34 half of depth of field

What is claimed is:

1. An aircraft with a safety distance display apparatus that is configured to display a visual indication on an obstacle for representing a current distance between the aircraft and the obstacle, the safety distance display apparatus comprises a first light source that emits a first light signal in a first predefined direction, and a second light source that emits a second light signal in a second predefined direction, wherein the first light signal crosses the second light signal at a predetermined safety distance from the aircraft, wherein the first light signal forms a first pattern and the second light signal forms a second pattern, wherein the first and second patterns overlap at the predetermined safety distance and/or wherein the first and second patterns are concentric at the predetermined safety distance, wherein the first pattern and the second pattern are intermittent light patterns respectively comprised of alternating light sectors and unilluminated sectors, wherein at the predetermined safety distance the first light signal and the second light signal combine into a single light signal that forms a continuous light pattern as the light sectors of the first pattern overlap with the unilluminated sectors of the second pattern at the predetermined safety distance and the light sectors of the second pattern overlap with the unilluminated sectors of the first pattern at the predetermined safety distance, and at distances from the aircraft other than the predetermined safety distance the first pattern and the second pattern are spaced apart from one another.

2. The aircraft of claim 1, wherein the first pattern is a first light line and the second pattern is a second light line.

3. The aircraft of claim 1, wherein the first light signal has a first color and the second light signal has a second color and/or wherein the first light signal has a first light intensity and the second light signal has a second light intensity.

4. The aircraft of claim 1, wherein at least one of the first and second light sources comprises a highly collimated laser.

5. The aircraft of claim 1, wherein at least one of the first and second light sources comprises an omnidirectionally emitting light source and an associated collimating optical element.

6. The aircraft of claim 4, wherein each one of the first and second light sources comprises an associated light encoding element for encoding the first and second light signals.

7. The aircraft of claim 1, wherein the first light source is mounted to a lower region of a fuselage of the aircraft and the second light source is mounted to an upper region of the fuselage.

8. The aircraft of claim 7, wherein the first light signal is emitted at a first predetermined tilt angle with respect to an associated reference plane and the second light signal is emitted at a second predetermined tilt angle with respect to an associated reference plane, wherein the associated reference planes are arranged in parallel.

9. The aircraft of claim 1, wherein the aircraft is a rotary wing aircraft with a multi-blade main rotor that comprises associated rotor blades, wherein the predetermined safety distance is greater than a respective rotor blade length.

10. The aircraft of claim 1, wherein an image analysis device is provided for monitoring a current distance between the aircraft and an obstacle on the basis of the first and second light signals.

11. The aircraft of claim 1, wherein the predetermined safety distance lies in a range between 10 m and 20 m.

12. The aircraft of claim 1, wherein the first and second light sources are spaced apart from each other by a distance of nominally 2 m, wherein a maximum acceptable positional error of the aircraft with respect to the obstacle amounts to approximately 0.5 m.

13. A safety distance display apparatus for displaying a visual indication on an obstacle for representing a current distance between a vehicle and the obstacle, comprising a first light source that emits a first light signal in a first predefined direction and a second light source that emits a second light signal in a second predefined direction, wherein the first light signal crosses the second light signal at a predetermined safety distance from the vehicle, wherein the first light signal forms a first pattern and the second light signal forms a second pattern, wherein the first and second patterns overlap at the predetermined safety distance and/or wherein the first and second patterns are concentric at the predetermined safety distance, wherein the first pattern and the second pattern are intermittent light patterns respectively comprised of alternating light sectors and unilluminated sectors, wherein at the predetermined safety distance the first light signal and the second light signal combine into a single light signal that forms a continuous light pattern as the light sectors of the first pattern overlap with the unilluminated sectors of the second pattern at the predetermined safety and the light sectors of the second pattern overlap with the unilluminated sectors of the first pattern at the predetermined safety distance, and at distances from the aircraft other than the predetermined safety distance the first pattern and the second pattern are spaced apart from one another.

14. The aircraft of claim 1, wherein at a distance from the aircraft smaller than the predetermined distance the first pattern is spaced apart above the second pattern, and at a distance from the aircraft greater than the predetermined distance the first pattern is spaced apart below the second pattern.

15. The aircraft of claim 13, wherein the first and second patterns are fan-shaped and wherein the first and second patterns comprise spaced apart lines when not at the predetermined safety distance.

16. An aircraft with a distance display apparatus, the distance display apparatus configured to display a visual indication on an obstacle representing a current distance between the aircraft and the obstacle, the distance display apparatus comprising a first light source to emit a first light signal in a first predefined direction, and a second light source to emit a second light signal in a second predefined direction, wherein the first light signal crosses the second light signal at a predetermined safety distance from the aircraft, wherein the first light signal forms a first pattern and the second light signal forms a second pattern, wherein the first and second patterns overlap at the predetermined safety distance and/or wherein the first and second patterns are concentric at the predetermined safety distance, wherein the first pattern and the second pattern are intermittent light patterns respectively comprised of an array of a predetermined numbers of alternating light sectors and unilluminated sectors, wherein at the predetermined safety distance the first light signal and the second light signal combine into a single light signal that forms a continuous light pattern as the light sectors of the first pattern overlap with the unilluminated sectors of the second pattern at the predetermined safety distance and the light sectors of the second pattern overlap with the unilluminated sectors of the first pattern at the predetermined safety distance, and at distances from the aircraft other than the predetermined safety distance the first pattern and the second pattern are spaced apart from one another.

17. The aircraft of claim 16,
wherein the first pattern is a first light line and the second pattern is a second light line and wherein an image analysis device is provided for monitoring a current distance between the aircraft and an obstacle on the basis of the first and second light signals and wherein the predetermined safety distance lies in a range between 10 m and 20 m.

18. The aircraft of claim 16,
wherein the first light signal has a first color and the second light signal has a second color and/or wherein the first light signal has a first light intensity and the second light signal has a second light intensity.

19. The aircraft of claim 16,
wherein at least one of the first and second light sources comprises a highly collimated laser.

20. The aircraft of claim 14,
wherein the first pattern is a first light line and the second pattern is a second light line whereby at the distance from the aircraft smaller than the predetermined distance the first light line is spaced apart above the second light line and at the distance from the aircraft greater than the predetermined distance the first light line is spaced apart below the second light line.

\* \* \* \* \*